United States Patent
Nijasure et al.

(10) Patent No.: US 10,922,868 B2
(45) Date of Patent: *Feb. 16, 2021

(54) SPLIT FRAME RENDERING

(71) Applicant: Advanced Micro Devices, Inc., Santa Clara, CA (US)

(72) Inventors: Mangesh P. Nijasure, Orlando, FL (US); Todd Martin, Orlando, FL (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,831

(22) Filed: Jun. 26, 2019

(65) Prior Publication Data
US 2019/0318527 A1  Oct. 17, 2019

Related U.S. Application Data

(63) Continuation of application No. 15/417,063, filed on Jan. 26, 2017, now Pat. No. 10,388,056.

(51) Int. Cl.
*G06T 15/00* (2011.01)
*G06F 9/44* (2018.01)
*G06T 11/40* (2006.01)

(52) U.S. Cl.
CPC ............. *G06T 15/005* (2013.01); *G06F 9/44* (2013.01); *G06T 11/40* (2013.01)

(58) Field of Classification Search
CPC .............................. G06T 17/20; G06T 17/205
See application file for complete search history.

(56) References Cited

U.S. PATENT DOCUMENTS

| | | |
|---|---|---|
| 7,525,547 B1 * | 4/2009 | Diard ........................ G06T 1/20 345/502 |
| 7,633,505 B1 | 12/2009 | Kelleher |
| 2013/0038620 A1 | 2/2013 | Hakura et al. |
| 2014/0146042 A1 * | 5/2014 | Park ........................ G06T 15/40 345/419 |
| 2017/0091989 A1 | 3/2017 | Ramadoss |
| 2018/0095463 A1 * | 4/2018 | Castleman ........... G05D 1/0022 |

* cited by examiner

*Primary Examiner* — Phi Hoang
(74) *Attorney, Agent, or Firm* — Volpe Koenig

(57) ABSTRACT

Improvements in the graphics processing pipeline that allow multiple pipelines to cooperate to render a single frame are disclosed. Two approaches are provided. In a first approach, world-space pipelines for the different graphics processing pipelines process all work for draw calls received from a central processing unit (CPU). In a second approach, the world-space pipelines divide up the work. Work that is divided is synchronized and redistributed at various points in the world-space pipeline. In either approach, the triangles output by the world-space pipelines are distributed to the screen-space pipelines based on the portions of the render surface overlapped by the triangles. Triangles are rendered by screen-space pipelines associated with the render surface portions overlapped by those triangles.

20 Claims, 11 Drawing Sheets

SPLIT FRAME RENDERING

This application is a continuation of U.S. patent application Ser. No. 15/417,063, filed on Jan. 26, 2017 which is incorporated by reference herein in its entirety.

TECHNICAL FIELD

The disclosed embodiments are generally directed to graphics processing pipelines, and in particular, to split frame rendering.

BACKGROUND

Three-dimensional graphics processing pipelines accept commands from a host (such as a central processing unit of a computing system) and process those commands to generate pixels for display on a display device. Graphics processing pipelines include a number of stages that perform individual tasks, such as transforming vertex positions and attributes, calculating pixel colors, and the like. Graphics processing pipelines are constantly being developed and improved.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to improvements in the graphics processing pipeline that allow multiple pipelines to cooperate to render a single frame. Two approaches are provided. In a first approach, world-space pipelines for the different graphics processing pipelines process all work for draw calls received from a central processing unit (CPU). In a second approach, the world-space pipelines divide up the work. Work that is divided is synchronized and redistributed at various points in the world-space pipeline. In either approach, the triangles output by the world-space pipelines are distributed to the screen-space pipelines based on the portions of the render surface overlapped by the triangles. Triangles are rendered by screen-space pipelines associated with the render surface portions overlapped by those triangles.

Figure 1:
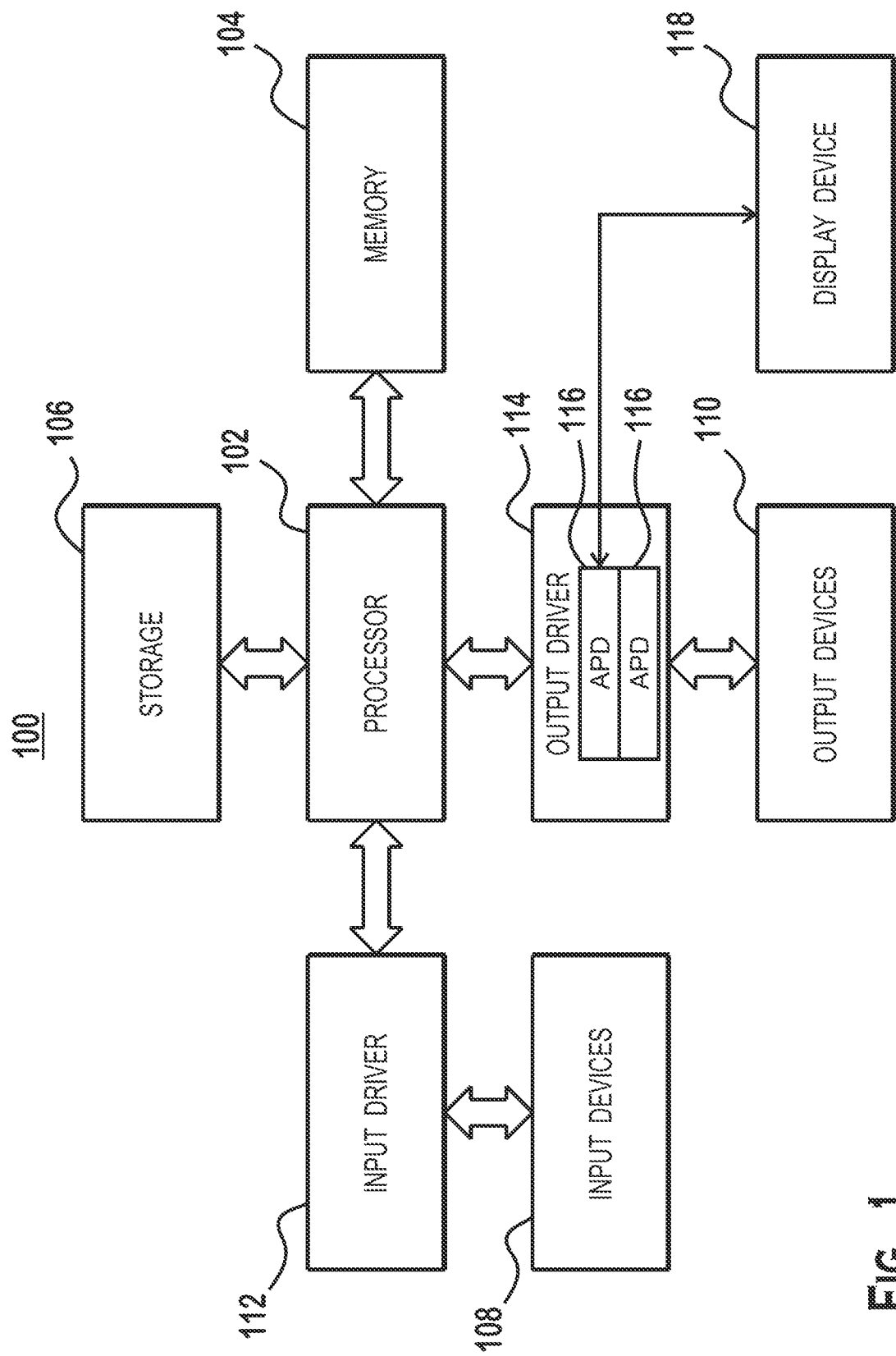
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes two or more parallel processing units configured to perform computations in accordance with a single-instruction-multiple-data ("SIMD") paradigm. Although two APDs 116 are illustrated, it should be understood that the teachings provided herein apply to systems including more than two APDs 116. However, functionality described as being performed by the APD 116 may also be performed by processing devices that do not process data in accordance with a SIMD paradigm.

Figure 2:
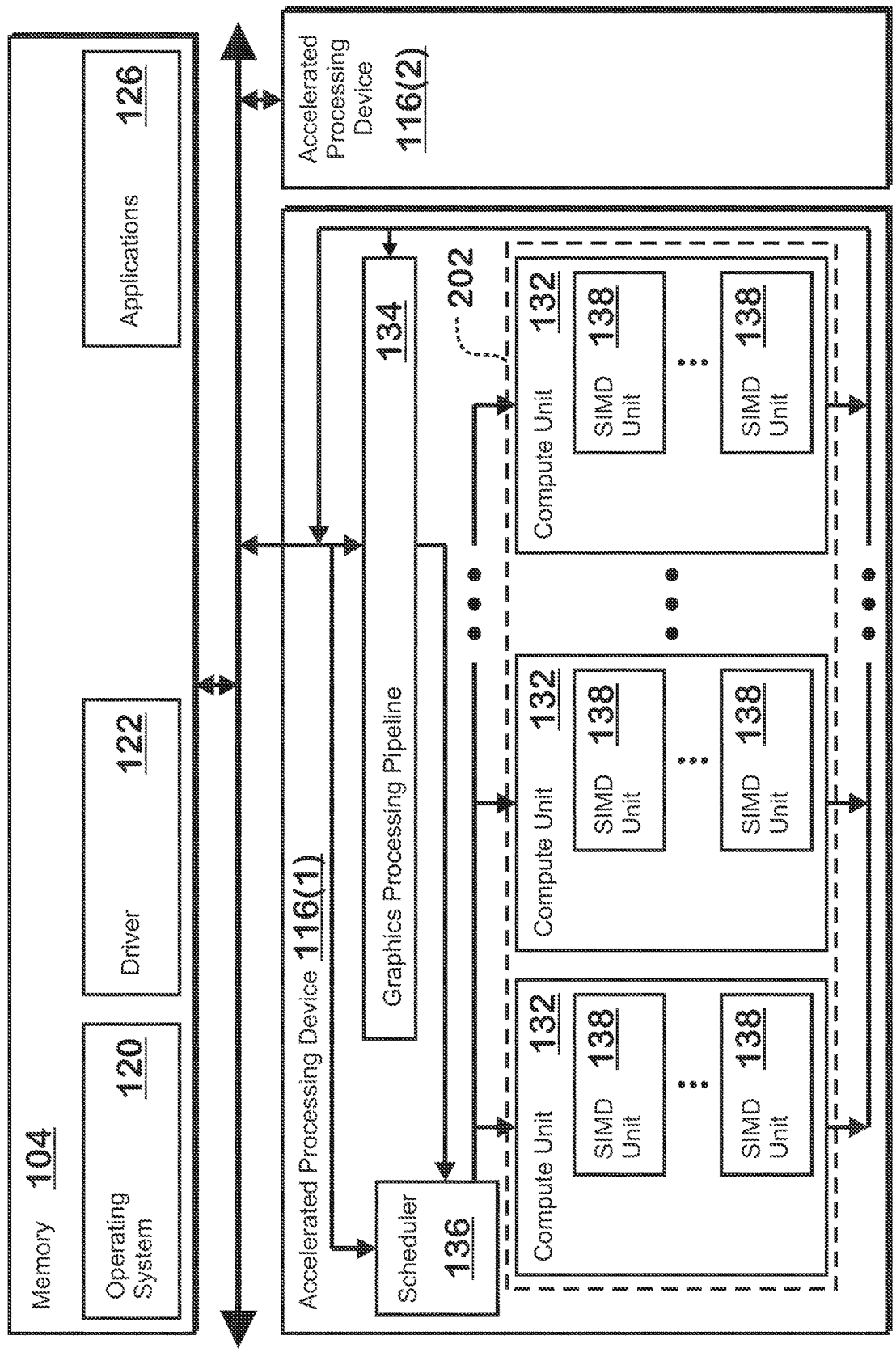
FIG. 2 is a block diagram of the device of FIG. 1, illustrating additional detail.

FIG. 2 is a block diagram of the device 100, illustrating additional details related to execution of processing tasks on the APDs 116. Two APDs 116 are illustrated (a first APD 116(1) and a second APD 116(2)). It should be understood that components described and shown as being include a single APD are also included in one or more additional APDs 116(2). Thus, components such as the graphics processing pipeline 134, scheduler 136, and compute units 132, shown as being included in APD 116(1) are also included in APD 116(2) and in other APDs 116 if such additional APDs 116 are included in the device 100. Operations described as being performed by one APD 116 are also performed by the same components on another APD 116.

The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes compute units 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane. Work-items are typically executed simultaneously as a "wavefront" on a single SIMD unit 138. Multiple wavefronts are be included in a "work group," which includes a collection of work-items designated to execute the same program. A work group is executed by executing each of the wavefronts that make up the work group. The wavefronts may executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A scheduler 136 is configured to perform operations related to scheduling various wavefronts on different compute units 132 and SIMD units 138, as well as performing other operations for orchestrating various tasks on the APD 116.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution.

Two APDs 116 are illustrated in FIG. 2. There two APDs 116 are configured to cooperate to render a single frame. Although details of the second illustrated APD 116 are not shown, the second APD 116(2) includes substantially the same components as the first APD 116(1). Also, although two APDs 116 are illustrated, it should be understood that the device 100 may alternatively include additional APDs 116 that cooperate to render frames.

Figure 3:
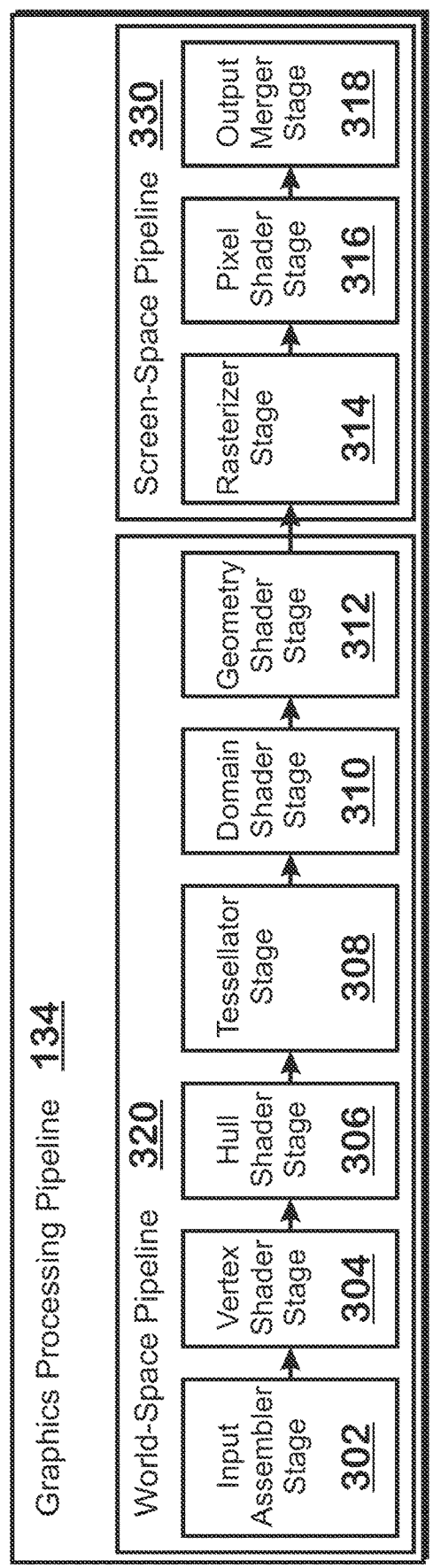
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes a world-space pipeline 320, which includes an input assembler stage 302, a vertex shader stage 304, a hull shader stage 306, a tessellator stage 308, a domain shader stage 310, and a geometry shader stage 312, and a screen-space pipeline 330, which includes a rasterizer stage 314, a pixel shader stage 316, and an output merger stage 318.

The input assembler stage 302 reads primitive data from user-filled buffers (e.g., buffers filled at the request of software executed by the processor 102, such as an application 126) and assembles the data into primitives for use by the remainder of the pipeline. As used herein, the term "user" refers to the application 126 or other entity that provides shader code and three-dimensional objects for rendering to the graphics processing pipeline 134. The term "user" is used to distinguish over activities performed by the APD 116. A "primitive" is a collection of one or more vertices and related information that defines a basic unit of rendering work. Examples of primitives include points (one vertex), lines (two vertices), triangles (three vertices), and other types of primitives. The input assembler stage 302 can generate different types of primitives based on the primitive data included in the user-filled buffers. The input assembler stage 302 formats the assembled primitives for use by the rest of the pipeline.

The world-space pipeline 320 performs vertex and primitive manipulation, converting objects defined in three-dimensional world-space to triangles defined in screen space. For this purpose, the world-space pipeline 320 includes an input assembler stage 302, a vertex shader stage 304, a hull shader stage 306, a tessellator stage 308, a domain shader stage 310, and a geometry shader stage 312. The world-space pipeline 320 performs functionality for converting the input received from a processor 102 into a form more amenable to rendering into screen pixels. More specifically, the world-space pipeline 320 performs vertex shading functions, optional tessellation functions if tessellation is enabled, and optional geometry shading functions if geometry shading is enabled.

The input assembler stage 302 reads primitive data from user-filled buffers (e.g., buffers filled at the request of software executed by the processor 102, such as an application 126) and assembles the data into primitives for use by the remainder of the pipeline.

The vertex shader stage 304 performs vertex shading, which includes performing various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of vertex shading may modify attributes other than the coordinates. Vertex shading is implemented partially or fully as vertex shader programs to be executed on one or more compute units 132.

The hull shader stage 306, tessellator stage 308, and domain shader stage 310 together implement tessellation. Tessellation converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage and domain shader stage are performed partially or fully by shader programs executing on the compute units 132.

The geometry shader stage 312 performs geometry shading, which involves operations on a primitive-by-primitive basis. A variety of different types of operations can be performed via geometry shading, including operations such as point sprite expansion, dynamic particle system operations, fur-fin generation, shadow volume generation, single pass render-to-cubemap, per-primitive material swapping, and per-primitive material setup. Operations for geometry shading are performed by a shader program that executes on the compute units 132.

The world-space pipeline 320 can be implemented as a combination of hardware (including fixed function and programmable hardware) and software, as all hardware (including all fixed function hardware, all programmable hardware, or a combination thereof), or entirely as software executing on a hardware processor. The world-space pipeline 320 outputs primitives (typically triangles) for processing by the screen-space pipeline 330 units in the graphics processing pipeline 134 for eventual conversion to screen-pixels to be written to a frame buffer and output to a display device 118 or to be output to a surface other than a frame buffer, such as a depth buffer, stencil buffer, or other buffer.

The rasterizer stage 314 accepts and rasterizes simple primitives (also referred to as "triangles" at the end of the world-space pipeline 320) generated upstream of the rasterizer stage 314. Rasterization consists of determining which screen pixels (or sub-pixel samples) are covered by a particular primitive and outputting fragments for each covered pixel or sub-pixel sample. A fragment is a candidate pixel that may or may not affect the final image output at the end of the graphics processing pipeline 134. Fragments are generated by the rasterizer stage 314 based on the results of rasterization of a triangle and are processed through the remainder of the pipeline. More specifically, fragments begin at the rasterizer stage 314, where fragments corresponding to each pixel or sub-pixel sample that is covered by a particular triangle being rasterized are output. Rasterization is performed by fixed function hardware or may be performed by shader programs executing in the compute units 132.

The pixel shader stage 316 calculates output values (e.g., color values) for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel, which are written to a frame buffer for output to the display device 118.

Various operations are described above as being performed by shader programs executing on one or more compute units 132. In some examples, the shader programs are provided by the processor 102 and are based on programs that are pre-written by a computer programmer. The driver 122 compiles such programs to generate the shader programs having a format suitable for execution within the compute units 132. In other examples, the shader programs are provided by the driver 122 directly, are retrieved from a memory of the APD 116 itself, or are provided through any other technically feasible means.

It is often desirable to allow multiple APDs 116 to work together to generate pixel colors for a render surface. However, issues with data communication and synchronization, as well as the fact that graphics objects are rendered in application programming interface order ("API order"—the order explicitly requested by the application 126 or other entity requesting rendering), make cooperation between multiple APDs 116 a less than trivial task. Several approaches are provided herein to allow multiple APDs 116 to work together to generate pixel colors for a render surface (such as a frame buffer that stores colors for output to a screen). In these approaches, the APDs 116 work together to generate different pixels for the same frame. Different APDs 116 are assigned different portions of the render surface and determine colors for pixels in those different portions of the render surface. The approaches provided herein vary in the amount of work that is duplicated on the different APDs 116. The purpose of duplicating at least some work is to reduce communication latency and complex synchronization operations associated with rendering a scene.

Figure 4:
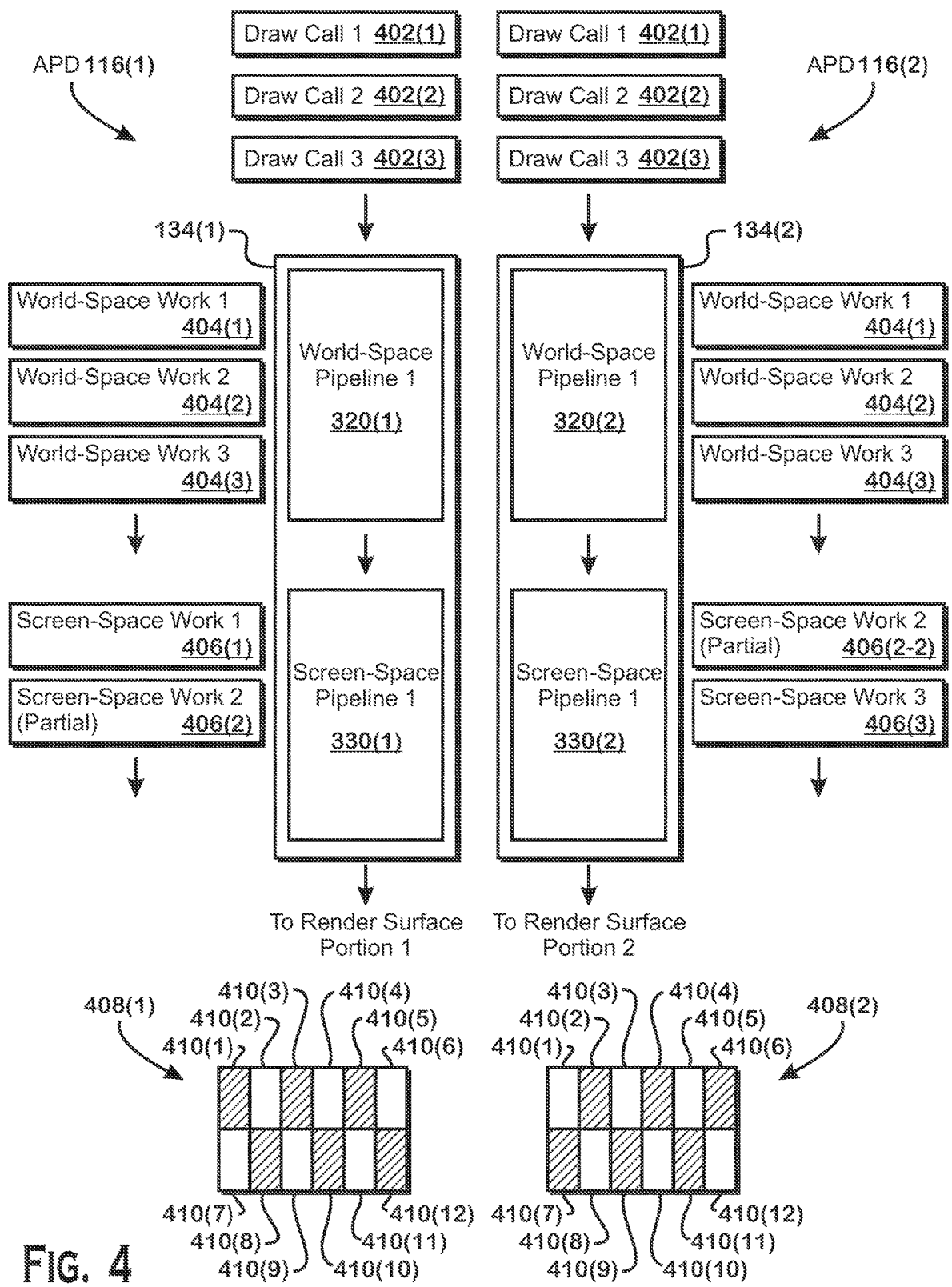
FIG. 4 illustrates a first approach for cooperation between APDs, according to an example.

FIG. 4 illustrates a first approach for cooperation between APDs 116 in which much of the rendering work is duplicated in the world-space pipelines 320 of the APDs 116 but divided between the APDs 116 in the screen-space pipelines 330 of the APDs 116, according to an example. More specifically, in this first approach, objects requested to be rendered are passed through the world-space pipelines 320 of each different APD 116. For screen-space processing, different APDs 116 are associated with different portions of a render target (e.g., the screen). When the work is ready for the graphics processing pipeline 134 to transmit the work to the screen-space pipelines 330 in a particular APD 116, that APD 116 determines which work overlaps the portion of the screen assigned to that APD 116. The APD 116 transmits work that overlaps the portion of the screen assigned to that APD 116 to the screen-space pipeline 330 of that APD 116 and discards work that does not overlap the portion of the screen assigned to that APD 116. The APD 116 transmits triangles that partially overlap the portion of the screen assigned to that APD 116 to the screen-space pipeline 330 of that APD 116, even if those triangles partially overlap a portion of the screen not assigned to that APD 116. The screen-space pipeline 330 generates fragments for the portion of the triangles that overlap the portion of the screen assigned to that APD 116. In some examples, for triangles that partially overlap the portion of the screen assigned to that APD 116, the screen-space pipeline 330 ignores and does not generate fragments for the portions of the triangles that do not overlap the portion of the screen assigned to that APD 116.

In FIG. 4, two APDs 116 are illustrated, each having different graphics processing pipelines 134 that include different world-space pipelines 320 and different screen-space pipelines 330. Although two APDs 116 are illustrated, it should be understood that the concepts discussed with respect to FIG. 4 apply similarly to configurations with additional APDs 116. FIG. 4 illustrates work input to the APDs 116, depicted as draw calls 402, which are requests to render graphics objects to a screen or other render target. Both world-space pipelines 320 receive substantially the same draw calls 402 (draw call 402(1), draw call 402(2), and draw call 402(3)), instead of dividing up work that is based on the draw calls 402, and process those draw calls 402 to generate work for processing by the screen-space pipeline 330.

The fact that both world-space pipelines 320 process substantially the same draw calls 402 means that both world-space pipelines 320 process the work for substantially the same draw calls 402 through the stages of the respective graphics processing pipelines 134 of the APDs 116 in which the different world-space pipelines 320 are located. Thus, the vertex shader stages 304 for both world-space pipelines 320 process substantially the same vertices. If tessellation is enabled for the work, then the hull shader stages 306, tessellator stages 308, and domain shader stages 310 for both world-space pipelines 320 process substantially the same patches to generate substantially the same tessellated output vertices. If geometry shading is enabled for the work, then both geometry shader stages 312 process substantially the same primitives. The output from both world-space pipelines 320 thus comprises substantially the same triangles, attributes, and other data that would be output from world-space pipelines 320.

Draw call 402(1), draw call 402(2), and draw call 402(3) are shown being input to both world-space pipelines 320 and world-space work 404(1), world-space work 404(2), and world-space work 404(3), based on draw call 402(1), draw call 402(2), and draw call 402(3), respectively, are shown as being processed by both world-space pipelines 320. The end result of processing the world-space work 404 by the world-space pipelines 320 is that both world-space pipelines 320 have substantially the same triangles, vertex attributes, and other information for use in the screen-space pipelines 330.

At the end of the world-space pipelines 320, each graphics processing pipeline 134 identifies which triangles output by the world-space pipeline 320 overlap the portion of the render surface 408 assigned to that graphics processing pipeline 134, transmits triangles that overlap that portion to the associated screen-space pipeline 330, and discards triangles that do not overlap the portion of the render surface 408 assigned to that graphics processing pipeline 134. In the example of FIG. 4, a render surface is split into multiple render surface subdivisions 410. A first render surface portion 408(1), which is assigned to the first graphics processing pipeline 134(1), includes render surface subdivision 410(2), render surface subdivision 410(4), render surface subdivision 410(6), render surface subdivision 410(7), render surface subdivision 410(9), and render surface subdivision 410(11). Thus, the world-space pipeline 320(1) for the first graphics processing pipeline 134(1) transmits triangles that overlap these render surface subdivisions 410 to the first screen-space pipeline 330(1) and discards triangles that do not overlap these render surface subdivisions 410. The world-space pipeline 320(2) for the second graphics processing pipeline 134(2) transmits triangles that overlap the second render surface portion 408(2), which is assigned to the second graphics processing pipeline 134(2), and includes render surface subdivision 410(1), render surface subdivision 410(3), render surface subdivision 410(5), render surface subdivision 410(8), render surface subdivision 410(10), and render surface subdivision 410(12), and discards triangles that do not overlap the second render surface portion 408(2). The difference in work that is received by the different screen-space pipelines 330 is reflected in the fact that the screen-space pipeline 330(1) is shown as processing screen-space work 406(1) and part of screen-space work 406(2-1), and the second screen-space pipeline 330(2) is shown as processing part of screen-space work 406(2-2) and screen-space work 406(3). Screen-space work 406(1) is derived from world-space work 404(1), screen-space work 406(3) is derived from world-space work 404(3), and both the part of screen-space work 406(2-1) and the part of screen-space work 406(2-2) are derived from world-space work 404(2).

The technique illustrated in FIG. 4 allows two or more APDs 116 to cooperate to render a frame by dividing screen-space work between the APDs 116. Work is duplicated in the world-space pipelines 320 for simplicity of implementation. Thus, while some work is duplicated, the screen-space work, which usually includes more work than the world-space work, is substantially not duplicated.

Figure 5:
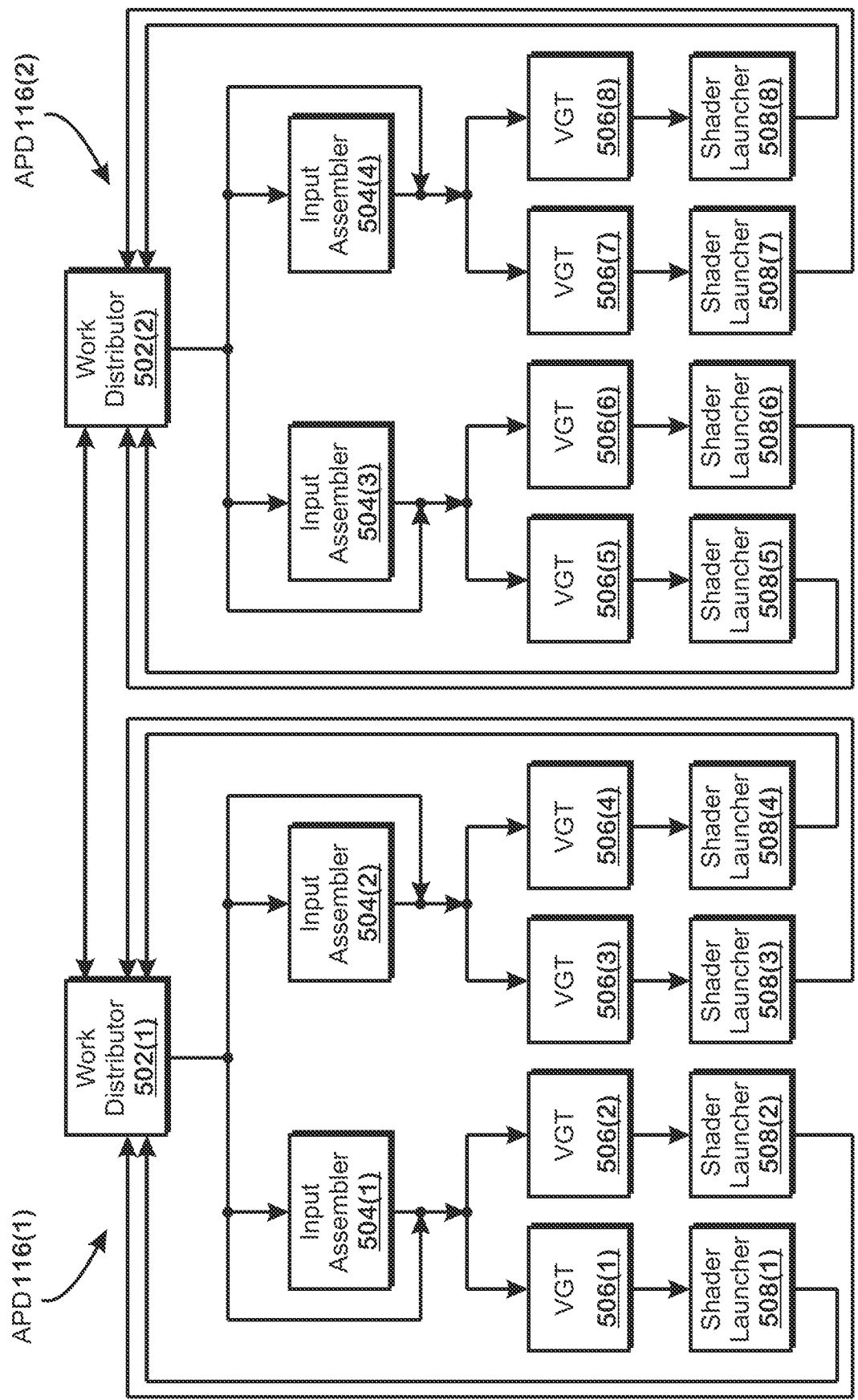
FIGS. 5-8 illustrate a second approach for cooperation between APDs, according to an example.

FIGS. 5-8 illustrate a second approach in which significantly less work is duplicated in the world-space pipeline 320 than the first approach, illustrated with respect to FIG. 4, according to an example. FIG. 5 illustrates details of a first APD 116(1) and a second APD 116(2) involved in distributing work through the world-space pipelines 320, according to an example.

Each APD 116 includes a work distributor 502 ("WD"), two input assemblers 504, four vertex, geometry, and tessellation units 506(2) ("VGT units 506" or just "VGTs 506"), and four shader launchers 508. Although an example with a specific number of these units is illustrated, it should be understood that in various other examples, other numbers of these units may be alternatively included. The work distributor 502(1) of one APD 116(1) is in communication with the work distributor 502(2) of the other APD 116(2).

The units illustrated in FIG. 5 are part of the APDs 116 but are not illustrated in previous figures. In general, these units orchestrate various operations of the graphics processing pipeline 134, such as distributing work to multiple parallel units, ordering work to execute in API order, launching work to execute in fixed function units, and launching shader programs to perform operations for programmable stages of the graphics processing pipeline 134.

The work distributor 502 distributes work for processing by other units shown. The work distributor 502 maintains information related to performing work in API order and manages scheduling of the work on other units in API order. The work distributor 502 distributes work to one or more input assemblers 504 or to one or more VGTs 506.

The input assemblers 504 accept requests to perform work from the work distributor 502, read input buffers that store vertex indices, perform the function of the input assembler stage 302, and issue work to the VGTs 506 based on the vertex indices. Vertex indices are identifiers that refer to vertices. Indices are used in some situations instead of vertices because indices include less data than vertices. More specifically, in some examples, indices are simple numerical values that refer to vertices while vertices include several numerical values, such as multiple coordinates or the like. Handling indices thus requires less power, wires, and the like than handling vertices, and so indices are used where the full vertex information is not needed.

In one example, the input assemblers 504 interpret sequences of indices (rather than vertices), identifying primitives based on a primitive topology and on positions of reset indices within the sequence of indices. Many primitive topologies are possible (point list, line list, line strip, triangle list, triangle strip, quad list, quad strip, and others, where "list" means that non-overlapping sequences of indices form the particular primitive and "strip" means that each new index in a sequence forms a primitive with the immediately prior indices such that overlapping sequences of indices form different primitives). Reset indices "cut" the strip of indices such that an index on one side of a reset index cannot form a primitive with an index on another side of the reset index. One task of the input assemblers 504 is to interpret the indices according to the specific sequence, primitive topology, and presence and location of reset indices.

The vertex, geometry, and tessellation units 506 ("VGT units 506") prepare work for launching in one of the stages of the world-space pipelines 320, such as the vertex shader stage 304, hull shader stage 306, tessellator stage 308, domain shader stage 310, and geometry shader stage 312. In some situations, the work distributor 502 provides work for processing directly to the VGTs 506, without passing that work through the input assemblers 504.

For work that is to be performed by shader programs, the VGTs 506 transmit that work to the shader launchers 508, which launch and control execution of shader programs on the programmable processing units 202. Results of work completed by shader programs that are returned to the work distributor 502 for further processing. It should be understood that some data flow paths between units illustrated in FIG. 5 are omitted for clarity.

Operations illustrated in conjunction with FIGS. 5-8 involve distribution of different work to different APDs 116 for processing in the world-space pipelines 320 in a manner in which significantly less work is duplicated across APDs 116 than the approach described with respect to FIG. 4. The APDs 116 synchronize data about work in progress at certain points during the data flow through the world-space pipelines 320, to maintain API order.

Figure 6:
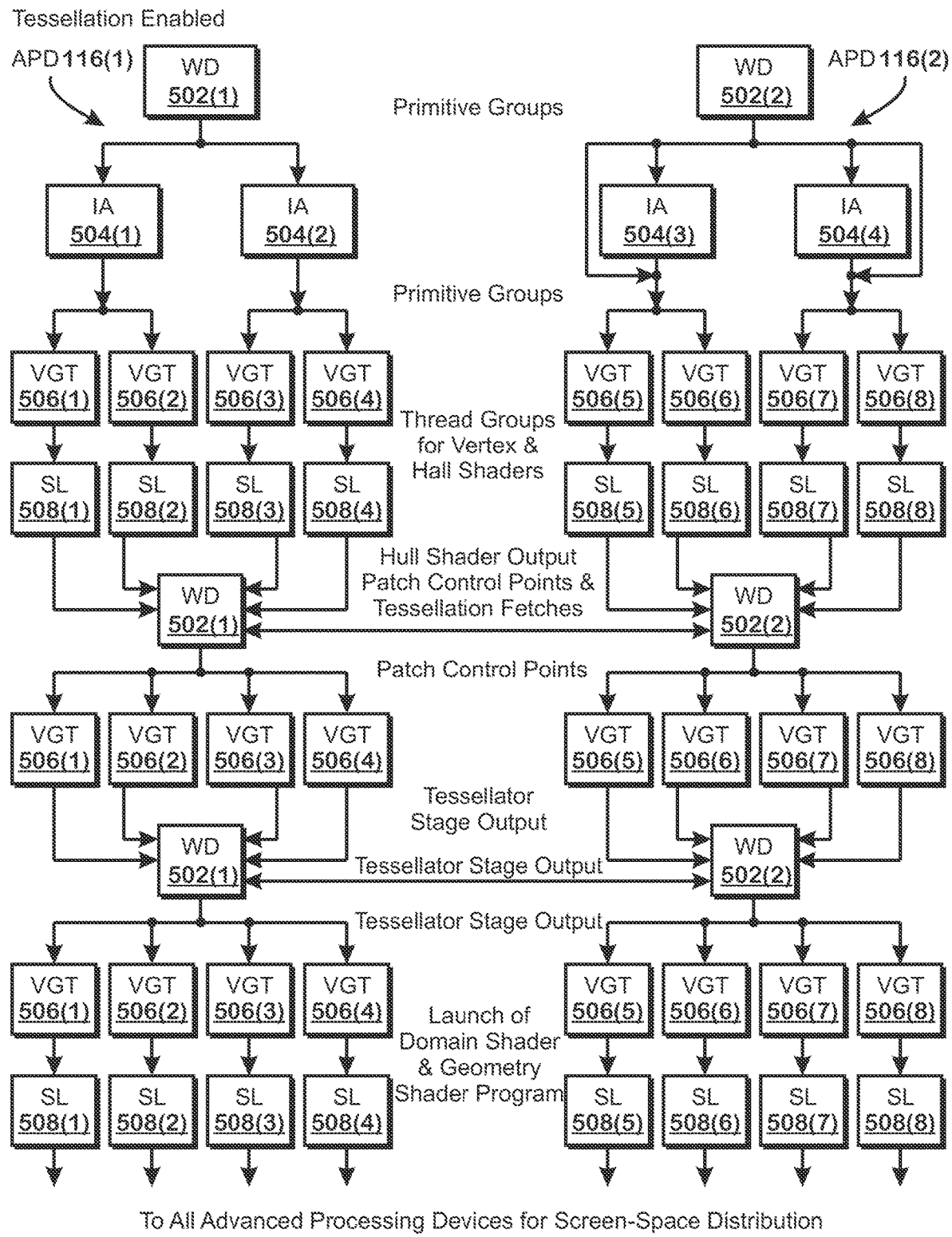

FIG. 6 illustrates data flow through the units of FIG. 5, to enable cooperation between two (or more) APDs 116, in a configuration in which tessellation is enabled in the graphics processing pipeline 134, according to an example. Within each "column" illustrated in FIG. 6 (where different columns represent components of different APDs 116), certain units are illustrated multiple times. This multiple illustration is done for purposes of clarity. It should be understood that the same reference number identifies the same unit, regardless of whether that unit is shown multiple times in FIG. 6.

The work distributors 502 receive draw calls from an entity requesting objects to be rendered (e.g., the processor 102). Each work distributor 502 receives substantially the same draw calls. The work distributors 502 split the draw calls into primitive groups and transmit the primitive groups to the input assemblers 504 for processing. The primitive groups are subdivisions of the work specified by the draw calls. Each primitive group includes a certain number primitives. In some implementations, different primitives groups have different numbers of primitives.

Although each APD 116 processes each draw call to determine which input assemblers 504 are to receive which primitive groups, each APD 116 does not process each primitive group in accordance with the stages of the world-space pipeline 320. Instead, the work for those stages is split between different APDs 116. To split this work, for any particular primitive group, each work distributor 502 selects, out of all input assemblers 504 in all APDs 116 that are cooperating to render a frame, one of the input assemblers 504 to transmit that primitive group to. If the selected input assembler 504 is in the same APD 116 as the work distributor 502 that made the selection, then that work distributor 502 transmits the primitive group to the selected input assembler 504. If the selected input assembler 504 is not in the same APD 116 as the work distributor 502 that made the selection, then that work distributor 502 discards the primitive group.

For any particular primitive group, all APDs 116 select the same input assembler 504 to receive that primitive group. In one example, for a first primitive group, all APDs 116 select a first input assembler 504(1), in APD 116(1), to receive that primitive group. For a second primitive group, all APDs 116 select a second input assembler 504(2), also in APD 116(2), to receive that primitive group. The difference between APDs 116 is that in each different APD 116, different primitive groups are discarded because each APD 116 includes different input assemblers 504.

In some examples, the work distributors 502 distribute primitive groups in round robin fashion, distributing roughly equal amounts of work to different input assemblers 504 in a repeating pattern. In one example, the work distributors 502 distribute primitive groups first to input assembler 504(1), then to input assembler 504(2), then to input assembler 504(3), then to input assembler 504(4), then back to input assembler 504(1), and so on. In another example, the work distributors 502 alternate between APDs 116, such as: first to input assembler 504(1), then to input assembler 504(3), then to input assembler 504(2), then to input assembler 504(4), and then to input assembler 504(1), and so on. In both examples, work distributor 502(1) would discard primitive groups distributed to input assembler 504(3) and input assembler 504(4) and work distributor 502(2) would discard primitive groups distributed to input assembler 504(1) and input assembler 504(2).

As described above, input assemblers 504 process indices to identify primitives based on a primitive topology and the location of reset indices. Input assemblers 504 share reset index information with input assemblers 504 in other APDs 116 in order to allow those input assemblers 504 to identify primitives within indices. More specifically, a particular set of indices is generally processed only by one input assembler 504. Indices in the earliest part of a set may be dependent on indices of a previous set for identification of primitives. Thus, input assemblers 504 request and obtain indices of an earlier set from other input assemblers 504 that are located in different APDs 116.

The input assemblers 504 distribute the primitive groups to the VGTs 506. As shown, each input assembler 504 is coupled to two VGTs 506. An input assembler 504 distributes primitive groups to the VGTs 506 attached to that input assembler 504 (one input assembler 504 is shown coupled to two VGTs 506 but the ratio of input assemblers 504 to VGTs 506 may be different than 1:2). Distributing means providing a primitive group either to one VGT 506 or another VGT 506. The VGTs 506 generate thread groups for the vertex shader stage 304 and the hull shader stage 306 and transmit the thread groups to the shader launchers 508 attached to that VGT 506 (each VGT 506 is coupled to one shader launcher 508, as shown, although the ratio between number of VGTs 506 and shader launchers 508 and the manner in which VGTs 506 and shader launchers 508 are coupled may vary). Thread groups are portions of work based on the primitive groups that are to be executed by shader programs for the vertex shader stage 304 and the hull shader stage 306. The VGTs 506 also transmit information identifying thread groups transmitted to the shader launchers 508 to the work distributors 502 and the work distributors 502 track thread groups that have been launched. This information includes API order information so that when the work distributors 502 launch subsequent work based on completed thread groups, the work distributors 502 are able to maintain API order for that subsequent work.

The shader launchers 508 launch shader programs to process the thread groups. When a shader program has completed processing a thread group, the WD 502 in the APD 116 that executed the shader program records the output of the thread groups and transmits information for the thread groups to the work distributors 502 in other APDs 116. This information includes at least API order information that allows the WD 502 to order the output of the completed thread groups. At this point, the output of the thread groups—patch control points—is ready to be processed by the tessellator stage 308 and all work distributors 502 hold information for the completed thread groups so that the work distributors 502 can synchronize scheduling of subsequent work (e.g., in the tessellator stage 308).

Figure 7A:
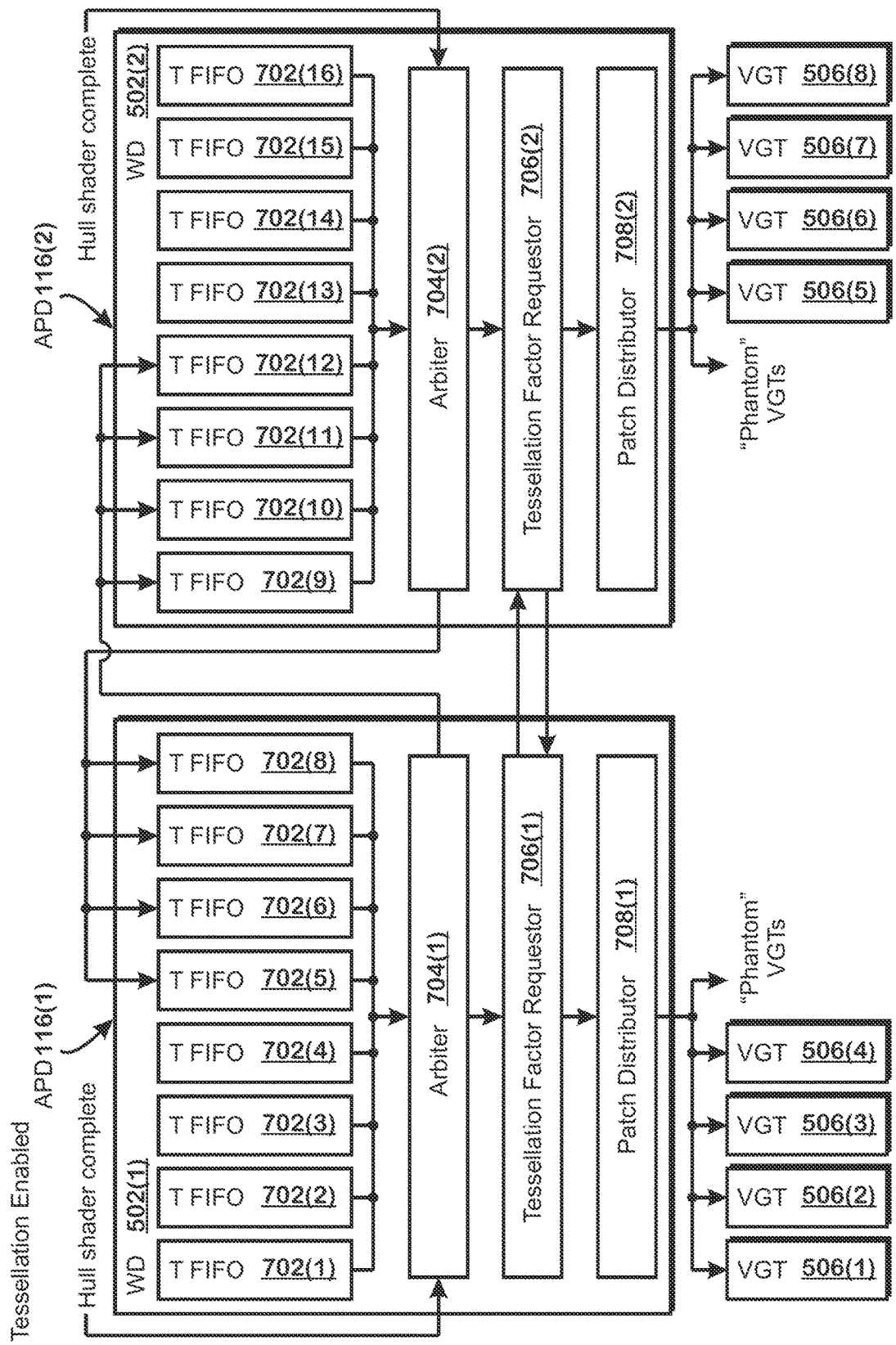
Figure 7B:
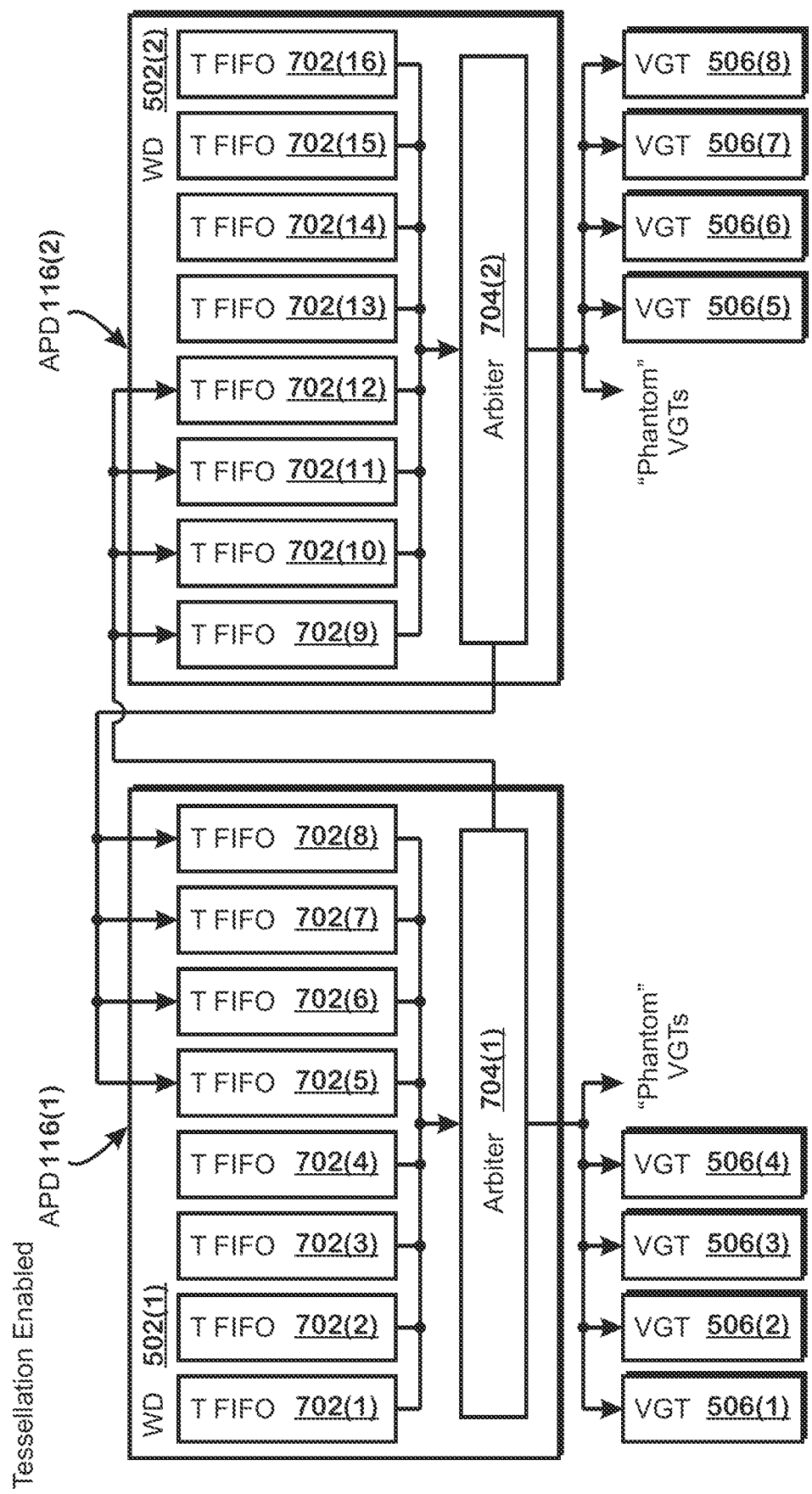

FIG. 7A illustrates details of the work distributors 502 related to distributing work for the tessellator stage 308, according to an example. Although certain elements are illustrated within the work distributor 502, it should be understood that elements not shown may be included as well. For example, some components of the work distributors 502 illustrated in FIG. 7A are not illustrated in FIG. 7B and some components illustrated in FIG. 7B are not shown in FIG. 7A.

As shown, the work distributors 502 include several tessellator first-in-first-out queues 702 ("T-FIFOs 702"), an arbiter 704, a tessellation factor requestor 706, and a patch distributor 708. Each T-FIFO 702 stores patch control points received from a particular VGT 506 as output of the hull shader stage 306 and does not store patch control points received from any other VGT 506. Entries in each T-FIFO 702 are stored in API order, with the next entry to be added being the newest in API order and the next entry to be removed being the oldest in API order. As described above, each work distributor 502 stores patch control points generated by all APDs 116, so that work can be issued in API order. The arbiter 704 selects patch control points from the different T-FIFOs 702 for distribution to the VGTs 506 for processing in the tessellator stage 308. The arbiter 704 selects control points from the T-FIFOs 702 in API order. In one example, the arbiter 704 maintains a "current" order counter and selects the set of control points that matches that "current" order counter, then increments the current order counter. The arbiter 704 repeats this process.

Because each work distributor 502 stores patch control points from all APDs 116, each arbiter 704 is able to select patch control points generated by any APD 116. The tessellation factor requestor 706 obtains tessellation factors for the selected patch control points. If an arbiter 704 selects patch control points generated by a different APD 116 than the APD 116 in which the arbiter 704 resides, then the tessellation factor requestor 706 requests the tessellation factors for those patch control points from the APD 116 that generated those patch control points. Tessellation factors determine the degree to which a patch is to be subdivided. When the tessellation factors are received, the arbiter 704 transmits the patch control points to the patch distributor 708. The patch distributor 708 selects a VGT 506 for a particular set of patch control points. If the selected VGT 506 is included within the APD 116 in which the patch distributor 708 resides, then the patch distributor 708 transmits the patch control points and tessellation factors to that VGT 506 for processing. If the selected VGT 506 is not included within the APD 116 in which the patch distributor 708 resides, then the VGT 506 is considered a "phantom" VGT and the control points and tessellation factors are discarded. For any particular set of control points and tessellation factors, patch distributors 708 on different APDs 116 determine the VGTs 506 to process the control points in the same manner, with the distinction that, because the different patch distributors 708 are on APDs 116 with different VGTs 506, each patch distributor 708 discards different sets of control points and tessellation factors.

When a VGT 506 receives control points for processing, the VGT 506 causes those control points to be processed by a fixed function tessellator for the tessellator stage 308. After processing in the tessellator stage 308, the VGT 506 transmits the output data (point lists) to each work distributor 502 for further processing in the world-space pipeline 320. The output data also includes an indication of API order for the processed work. Transmission of the control points and tessellation factors to the VGTs 506 is illustrated in FIG. 6 as being performed by the second "instance" of the work distributors 502, where "second instance" refers to the second time the work distributors 502 are shown in each column, starting from the top (e.g., the top-most time the work distributor 502 is shown is the "first instance," the middle work distributor 502 is the "second instance," and the bottom work distributor 502 is the "third instance").

The output of the tessellator stage 308 includes vertices that form primitives for processing by the domain shader stage 310 and geometry shader stage 312, if enabled. The VGTs 506 provide this output to the work distributors 502 as "subgroups," which are collections of work limited in amount either by number of vertices or number of primitives. To generate subgroups, the VGTs 506 aggregate vertices and primitives until either a programmable number of vertices or a programmable number of primitives is reached. The aggregated vertices and primitives constitute the subgroup.

FIG. 7B illustrates details of the work distributor 502 associated with processing after the tessellator stage 308 (e.g., processing in the domain shader stage 310 and the geometry shader stage 312 if enabled), according to an example. The components of the work distributor 502 illustrated in FIG. 7B are also used to perform processing for the vertex shader stage 304 and geometry shader stage 312 (if enabled) in the case that tessellation is disabled. In either case, the data processed by the components of the work distributor 502 illustrated in FIG. 7B are the subgroups described above. When tessellation is disabled, the subgroups include vertices for processing by the vertex shader stage 304. Data flow for the situation in which tessellation is disabled is discussed in more detail with respect to FIG. 8.

The subgroups are stored in subgroup first-in-first-out buffers ("S-FIFOs" 722). As with the T-FIFOs 702, each S-FIFO 722 is assigned to receive data (in this case, subgroups) from a single VGT 506. Subgroups are stored in S-FIFOs 722 in API order. Each work distributor 502 gets a copy of each subgroup, so that the work distributors 502 are able to consistently schedule subgroups for processing in API order.

The arbiters 724 in each work distributor 502 assign subgroups to VGTs 506 in the same manner as each other, assigning particular subgroups to the same VGTs 506. The arbiters 724 maintain API order by maintaining an API order counter, selecting the subgroup for the "next" API order from one of the S-FIFOs 722 based on that counter, and transmitting that subgroup to a VGT 506 for processing. If an arbiter 724 selects a VGT 506 that is not in the same APD 116 as the arbiter 724, then that VGT 506 is considered a "phantom VGT" and the APD 116 discards the subgroup. If an arbiter 724 selects a VGT 506 that is in the same APD 116 as the arbiter 724, then the arbiter 724 transmits the subgroup to that VGT 506.

Transmission of the subgroup to the VGTs 506 is shown as being performed by the third "instance" of the work distributors 502 in FIG. 6. After this transmission, the VGTs 506 pass the subgroup to the shader launchers 508, which launch shader programs to process the subgroup for the domain shader stage 310 and the geometry shader stage 312 if enabled.

After this processing, the graphics processing pipelines transmit the processed data to the screen-space pipelines 330 for processing. In one example, this transmission occurs in a similar fashion as described for the first approach (FIG. 4). More specifically, the APDs 116 share all information processed by all shader launchers 508 in each APD 116. This information includes triangles for processing by the screen-space pipeline 330. Each APD 116 determines whether triangles overlap a render surface portion 408 assigned to that APD 116. If the APD 116 determines that a triangle overlaps a render surface portion 408 assigned to that APD 116, then the APD 116 transmits that triangle to the screen-space pipeline 330 of that APD 116. If the APD 116 determines that a triangle does not overlap a render surface portion 408 assigned to that APD 116, then the APD 116 discards that triangle.

In the description provided herein, work is sometimes described as being transmitted to the work distributor 502 which then transmits that work to another unit such as the VGT 506. In various implementations, this series of transfers is comprises requests for ordering work and does not require that all the data for particular work be transferred to a WD 502 and then back to a different unit 506. For instance, tessellator stage output is described as being transmitted to a WD 502 and then to a VGT 506. However, in some implementations, this operation is simply an ordering request, with the VGTs 506 requesting that the WD 502 indicate an order in which the tessellator stage output is processed and then processing the work in that order.

Figure 8:
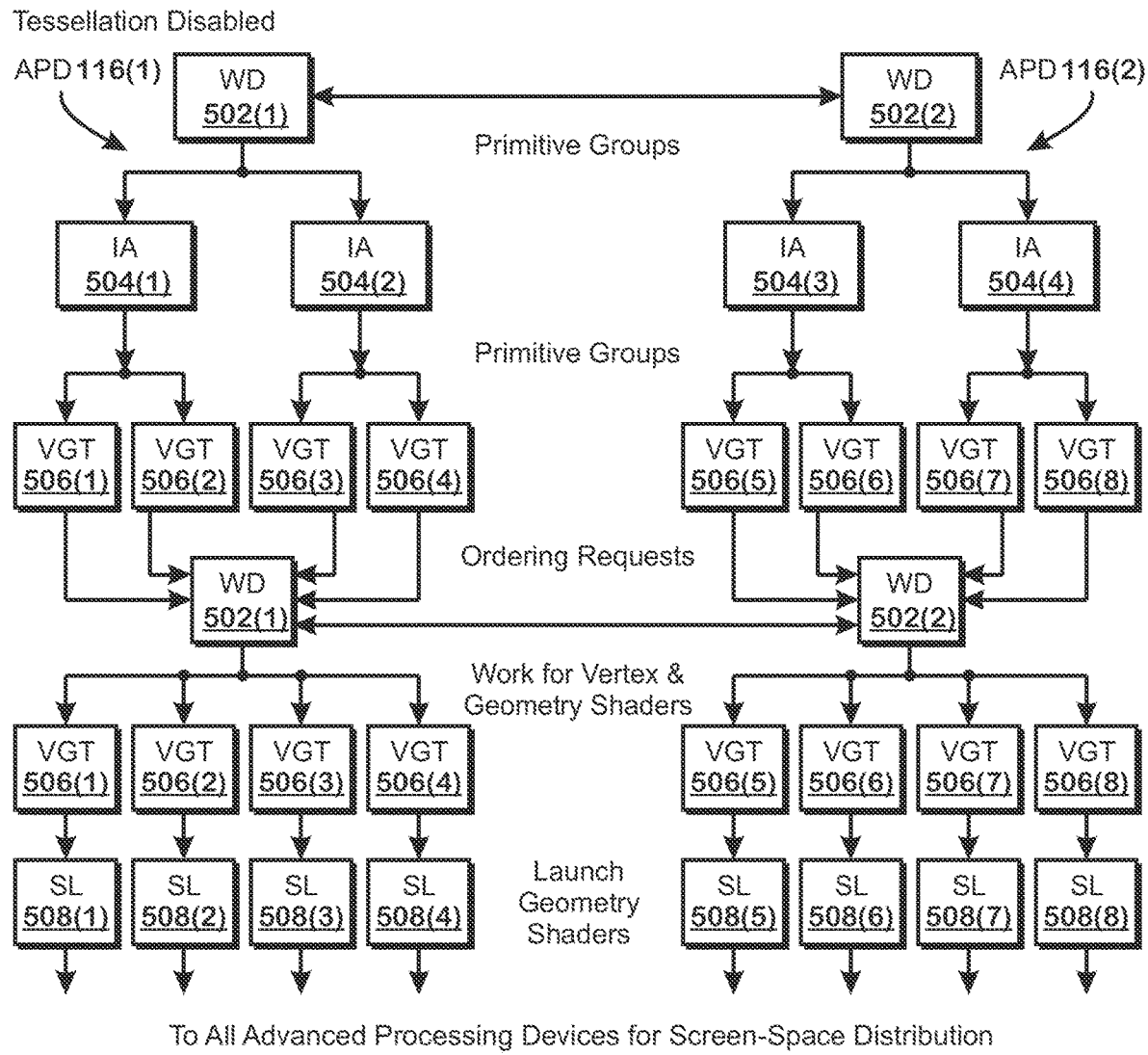

FIG. 8 illustrates the data flow that occurs in the system of FIG. 5 in the situation that tessellation is not enabled, according to an example. In this configuration, both work distributors 502 receive substantially the same draw calls and generate primitive groups from the draw calls. The work distributors 502 select input assemblers 504 to receive primitive groups substantially as described with respect to FIG. 5. More specifically, for any particular primitive group, each work distributor 502 determines, out of all input assemblers 504 in the APDs 116, which input assembler 504 is to receive the primitive group. If a work distributor 502 identifies an input assembler 504 that is not in the same APD 116 as the work distributor 502, then the work distributor 502 discards that primitive group. If the work distributor 502 identifies an input assembler 504 that is in the same APD 116 as the work distributor 502, then the work distributor 502 transmits that primitive group to the identified input assembler 504.

Upon receiving the primitive groups, the input assemblers 504 divide the primitive groups to distribute the primitive groups to the VGTs 506. The VGTs 506 generate subgroups based on the primitive groups. Subgroups are collections of work for execution in a shader program and include up to a programmable number of vertices or a programmable number of primitives. The VGTs 506 transmit the generated subgroups to the work distributors 502 in each APD 116. The subgroups are transmitted to each work distributor 502 for synchronization, as described with respect to FIG. 7B. The work distributors 502 distribute work among VGTs 506 utilizing the subgroup first-in-first-out queues 722 ("S-FIFOs 722"). Each S-FIFO 722 is associated with a different VGT 506 and receives the subgroups for distribution from that VGT 506. The arbiter 724 selects a next subgroup in API order for transmission to the VGTs 506.

Upon receiving a subgroup, a VGT 506 transmits the subgroup to a shader launcher 508, which launches shader programs for the vertex shader stage 304 and geometry shader stage 312 if enabled, to process the subgroup. After this processing, the graphics processing pipelines 134 transmit the processed data to the screen-space pipelines 330 for processing. In one example, this transmission occurs in a similar fashion as described for the first approach (FIG. 4). More specifically, the APDs 116 share all information processed by all shader launchers 508 in each APD 116. This information includes triangles for processing by the screen-space pipeline 330. Each APD 116 determines whether triangles overlap a render surface portion 408 assigned to that APD 116. If the APD 116 determines that a triangle overlaps a render surface portion 408 assigned to that APD 116, then the APD 116 transmits that triangle to the screen-space pipeline 330 of that APD 116. If the APD 116 determines that a triangle does not overlap a render surface portion 408 assigned to that APD 116, then the APD 116 discards that triangle.

Figure 9:
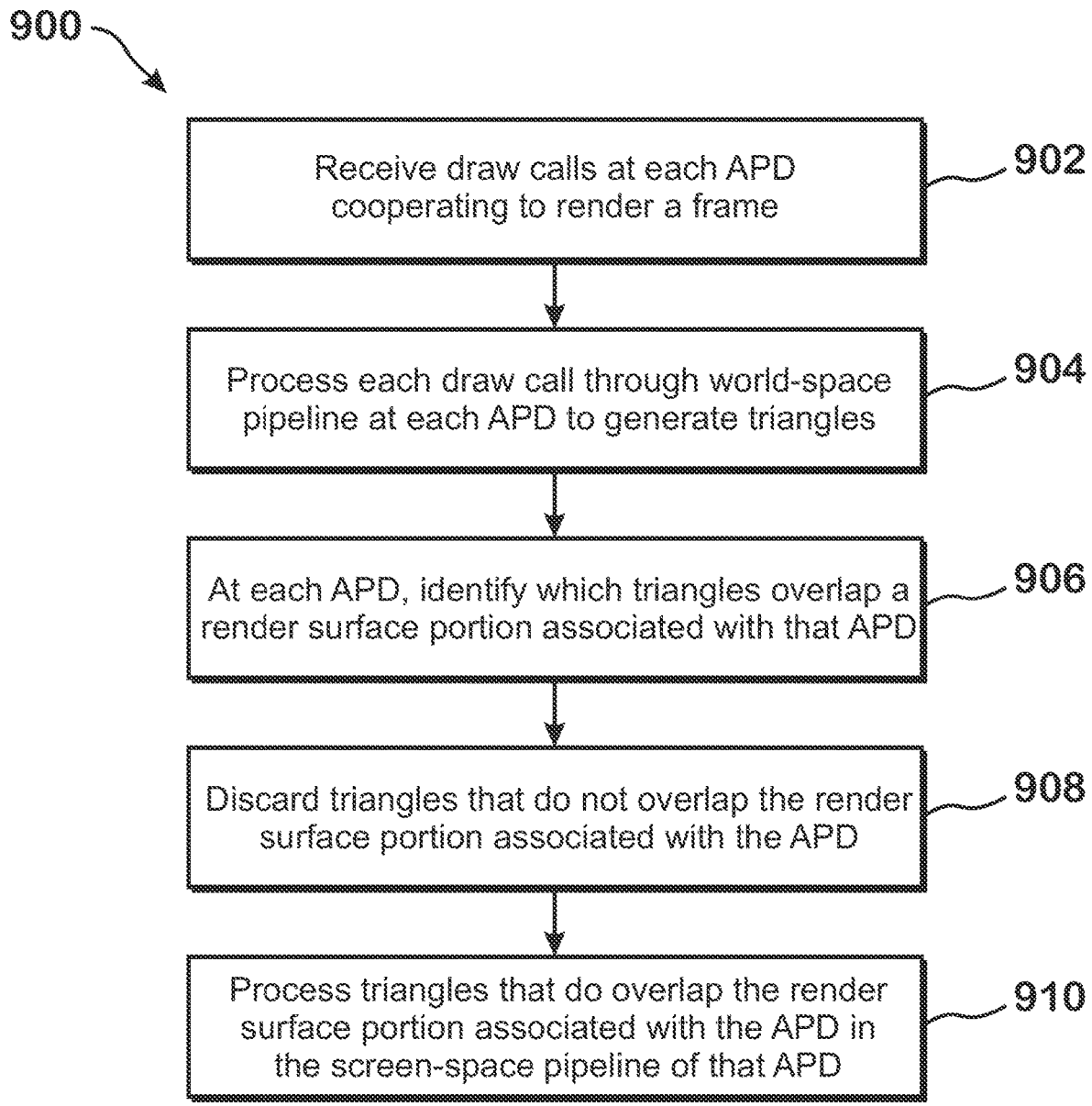
FIG. 9 is a flow diagram of a method for rendering a frame of graphics data using multiple APDs, according to a first example approach.

FIG. 9 is a flow diagram of a method 900 for rendering a frame of graphics data using multiple APDs 116, according to a first example approach. Although described with respect to the system shown and described with respect to FIGS. 1-8, it should be understood that any system configured to perform the method, in any technically feasible order, falls within the scope of the present disclosure.

The method 900 begins at step 902, where each APD 116 receives draw call specifying objects to be rendered. Each APD 116 receives substantially the same draw calls. At step 904, each APD 116 processes the draw calls in respective world-space pipelines 320 to generate triangles for processing by the screen-space pipelines 330. Each world-space pipeline 320 generates substantially the same triangles.

At step 906, each APD 116 identifies which triangles overlap the render surface portion associated with that APD 116. At step 908, each APD 116 discards triangles that do not overlap the render surface portion associated with that APD 116. At step 910, each APD 116 processes, in the screen-space pipeline 330, triangles that do overlap the render surface portion associated with the APD 116.

Figure 10:
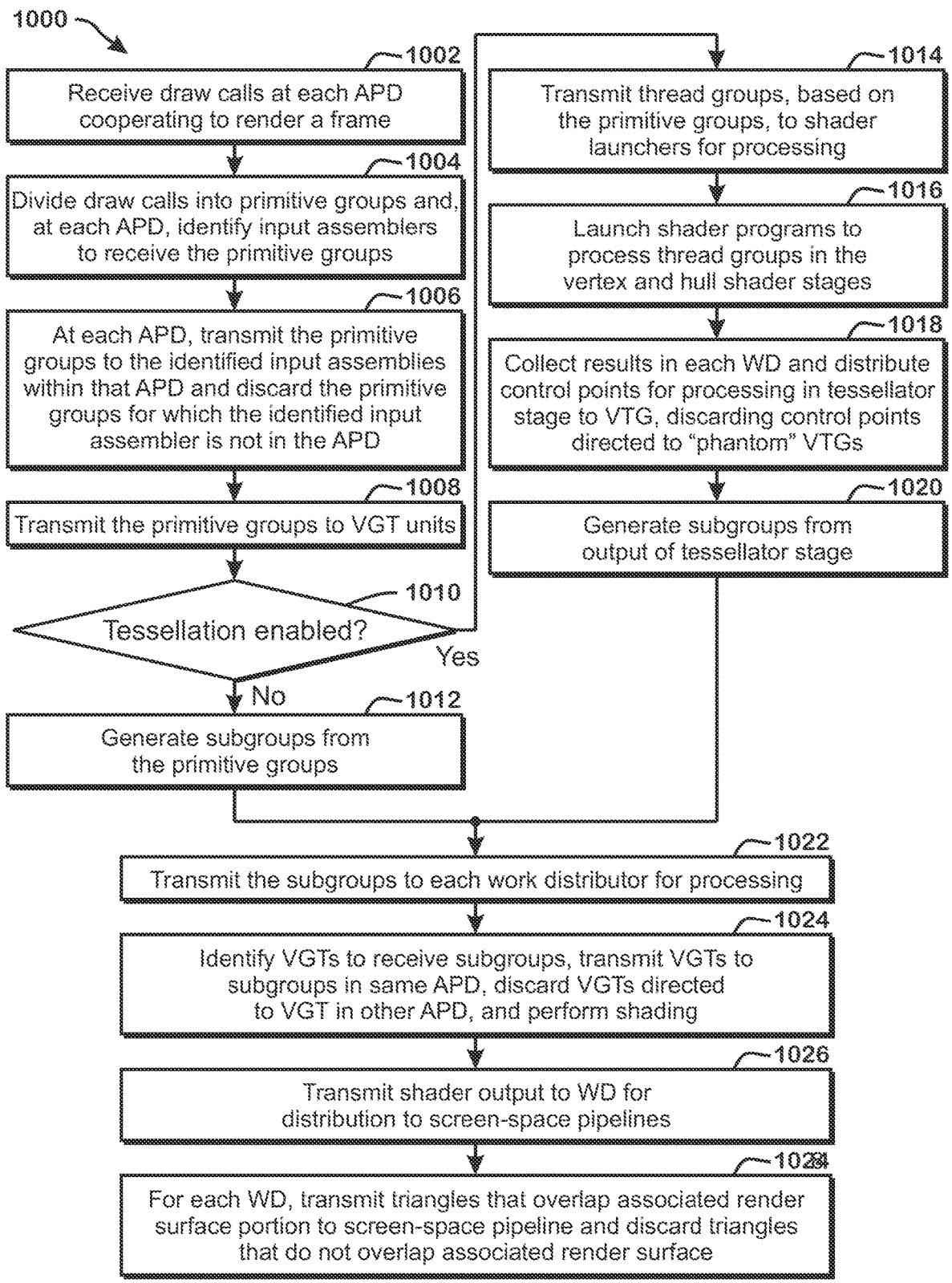
FIG. 10 is a flow diagram of a method for rendering a frame of graphics data using multiple APDs, according to a second example approach.

FIG. 10 is a flow diagram of a method 1000 for rendering a frame of graphics data using multiple APDs 116, according to a second example approach. Although described with respect to the system shown and described with respect to FIGS. 1-8, it should be understood that any system configured to perform the method, in any technically feasible order, falls within the scope of the present disclosure.

The method 1000 begins at step 1002, where each APD 116 receives substantially the same draw calls that specify objects to be rendered. At step 1004, work distributors 502 in the APDs 116 generate primitive groups and divide the primitive groups to all input assemblers 504 present on all of the APDs 116. For any particular primitive group, each APD 116 identifies the same input assembler 504 to receive that primitive group.

At step 1006, each APD 116 transmits the primitive groups to the identified input assemblers 504 within that APD 116 that made the decision of which input assembler 504 to send the primitive group to and discards the primitive groups for which the identified input assembler 504 is not in the APD 116 that made the decision of which input assembler 504 to send the primitive group to. At step 1008, input assembler 504 divides the primitive groups and transmits the divided primitive groups to VGTs 506 coupled to the input assembler 504.

At step 1008, each APD 116 determines whether tessellation is enabled. If tessellation is enabled, then the method 1000 proceeds to step 1014 and if tessellation is not enabled, then the method 1000 proceeds to step 1022. At step 1014, the VGTs 506 generate thread groups from the primitive groups and transmit the thread groups to the shader launchers 508 for processing for the vertex shader stage 304 and the hull shader stage 306.

At step 1016, the shader launchers 508 launch shader programs to process the thread groups for the vertex shader stage 304 and the hull shader shader stage 306. At step 1018, the work distributor 502 in each APD 116 collects results of the processing in the hull shader stage 306 from each APD 116 in a series of tessellator FIFOs ("T-FIFOs") 702. Each T-FIFO 702 stores the output of the hull shader stage 306 in API order, with the next element to be popped off the T-FIFO 702 being the oldest element in API order and the next element to be placed on the T-FIFO 702 being the newest element in API order. Further, each T-FIFO 702 is associated with, and receives hull shader stage output from, a distinct VGT 506. Also at step 1018, the work distributors select VGTs 506 to receive the hull shader stage output for processing in the tessellator stage 308. The selection is done in the same manner on each APD 116. The difference between APDs 116 is that different APDs 116 include different VGTs 506. Each APD 116 discards hull shader stage output that is directed to VGTs 506 not in that APD 116 and passes hull shader output that is directed to VGTs 506 in that APD 116. The APDs 116 select data for transmission to VGTs 506 from the T-FIFOs 702 in API order. The VGTs 506 process this data in the tessellator stage 308 to generate vertices for processing in the domain shader stage 310.

At step 1020, the VGTs 506 generate subgroups from the vertices output from the tessellator stage 308. Generating subgroups includes accumulating vertices or primitives from the tessellator stage 308 until a maximum number of vertices or primitives have been collected.

Returning back to step 1010, if tessellation is not enabled, the method 1000 proceeds to step 1012, where the VGTs 506 generate subgroups from the primitive groups. At step 1022, the VGTs 506 transmit the subgroups to each work distributor 502 for processing. More specifically, the VGTs 506 transmit the subgroups to subgroup first-in-first-out queues ("S-FIFOs") 722. The S-FIFOs 722 store the subgroups in API order.

At step 1024, the work distributors 502 identify VGTs 506 to receive and process the subgroups. More specifically, the work distributors 502 obtain the next subgroup from the S-FIFOs 722, in API order, and identify a VGT 506 to receive that subgroup. The work distributors 502 transmit the subgroups to identified VGTs 506 within the same APD 116 as the work distributor 502 and discards subgroups identified for transmission to a VGT 506 outside the APD 116. Each work distributor 502 selects VGTs 506 in the same manner for any given subgroup, but different work distributors 502 discard different subgroups because different work distributors 502 are in different APDs 116, which have different VGTs 506. If tessellation is enabled, the VGTs 506 perform domain shading for the domain shader stage 310 and geometry shading for the geometry shader stage 312 if enabled. If tessellation is disabled, the VGTs 506 perform vertex shading for the vertex shader stage 304 and geometry shading for the geometry shader stage 312 if enabled.

At step 1026, each APD 116 transmits the output from step 1024, which includes processed triangles, to each APD 116 for distribution to the screen-space pipelines 330. At step 1028, each work distributor 502 determines whether a triangle overlaps a portion of the render surface associated with the APD 116 in which the work distributor 502 is located. The APD 116 transmits triangles that overlap a portion of the render surface associated with the APD 116 to the screen-space pipeline 330 of that APD 116 for processing and discards triangles that do not overlap a portion of the render surface associated with the APD 116.

A method for sharing graphics processing work among multiple accelerated processing devices is provided. The method includes obtaining, at a first accelerated processing device ("APD"), a set of triangles processed by a first world-space pipeline of the first APD and a second world-space pipeline of a second APD. The method also includes obtaining, at the second APD, the set of triangles. The method further includes discarding, at the first APD, a first subset of the set of triangles that do not overlap a first render surface portion associated with the first APD and processing a first subset of the set of triangles that do overlap the first render surface portion associated with the first APD in a first screen-space pipeline of the first APD. The method also includes discarding, at the second APD, a second subset of the set of triangles that do not overlap a second render surface portion associated with the second APD and processing a second subset of the set of triangles that do overlap the second render surface portion associated with the second APD in a second screen-space pipeline of the second APD.

A set of accelerated processing devices ("APDs") for sharing graphics processing work is also provided. The set APDs includes a first APD and a second APD. The first APD is configured to receive a set of triangles processed by a first world-space pipeline of the first APD and a second world-space pipeline of the second APD, discard a first subset of the set of triangles that do not overlap a first render surface portion associated with the first APD, and process a first subset of the set of triangles that do overlap the first render surface portion associated with the first APD in a first screen-space pipeline of the first APD. The second APD is configured to receive the set of triangles, discard the first subset of the set of triangles that do not overlap the second render surface portion, and process the second subset of the set of triangles that do overlap the second render surface portion.

A computing device is also provided. The computing device includes a central processing unit configured to generate draw calls and a set of accelerated processing devices ("APDs") for sharing graphics processing work. The set of APDs comprises a first APD and a second APD. The first APD is configured to receive a set of triangles processed by a first world-space pipeline of the first APD and a second world-space pipeline of the second APD, discard a first subset of the set of triangles that do not overlap a first render surface portion associated with the first APD, and process a first subset of the set of triangles that do overlap the first render surface portion associated with the first APD in a first screen-space pipeline of the first APD. The second APD is configured to receive the set of triangles, discard the first subset of the set of triangles that do not overlap the second render surface portion, and process the second subset of the set of triangles that do overlap the second render surface portion.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for sharing graphics processing work among multiple accelerated processing devices ("APD") of a set of APDs, the method comprising:
   transmitting a set of draw calls to each APD of the set of APDs;
   splitting the set of draw calls into a set of primitive groups;
   for each primitive group of the set of primitive groups, designating an input assembler to receive that primitive group, wherein for each primitive group, the designated input assembler is the same for each APD;
   at each APD, for a first set of primitive groups designated to be received by input assemblers of that APD, transmitting the first set of primitive groups to the designated input assemblers; and
   at each APD, for a second set of primitive groups designated to be received by input assemblers outside of that APD, discarding the second set of primitive groups.

2. The method of claim 1, wherein:
   designating the input assemblers to receive the primitive groups occurs in a round robin fashion with respect to the input assemblers.

3. The method of claim 1, further comprising:
   distributing the primitive groups, from each input assembler, to one or more attached vertex, geometry, and tessellation units for processing by shader programs.

4. The method of claim 3, further comprising:
   transmitting the primitive groups to a hull shader for generation of patch control points.

5. The method of claim 4, further comprising:
   transmitting the patch control points to a tessellation first-in-first-out buffer ("T-FIFO") of a set of T-FIFOs.

6. The method of claim 5, further comprising:
   selecting, by an arbiter, a T-FIFO of the set of T-FIFOs from which to receive a set of patch control points;
   responsive to determining that one or more tessellation factors for the patch control points are available in an accelerated processing device other than the accelerated processing device that includes the arbiter, requesting the one or more tessellation factors from the accelerated processing device other than the accelerated processing device that includes the arbiter; and
   processing the set of patch control points and the one or more tessellation factors by a patch distributor.

7. The method of claim 6, wherein processing the set of patch control points and the one or more tessellation factors by the patch distributor comprises:
   selecting, by the patch distributor, a first vertex, geometry, and tessellation unit, to receive the set of patch control points generated by a hull shader stage; and
   responsive to determining that the first vertex, geometry, and tessellation unit is included in the same accelerated processing device as the patch distributor, transmitting the set of patch control points to the first vertex, geometry, and tessellation unit.

8. The method of claim 7, further comprising:
   selecting, by the patch distributor, a second vertex, geometry, and tessellation unit, to receive a second set of patch control points generated by the hull shader stage; and
   responsive to determining that the first vertex, geometry, and tessellation unit is not included in the same accelerated processing device as the patch distributor, discarding the second set of patch control points.

9. The method of claim 1, further comprising:
   processing the first set of primitive groups by a world-space pipeline and a screen-space pipeline.

10. A set of accelerated processing devices for sharing graphics processing work, the set comprising:
    a first accelerated processing device ("APD"); and
    a second APD,
    wherein both the first and second APD are configured to:
    receive a set of draw calls;
    split the set of draw calls into a set of primitive groups; and for each primitive group of the set of primitive groups, designate an input assembler to receive the primitive group, wherein for each primitive group, the designated input assembler is the same for the first APD and the second APD;

wherein the first APD is configured to:
for a first set of primitive groups designated to be received by input assemblers of the first APD, transmit the first set of primitive groups to the designated input assemblers; and
for a second set of primitive groups designated to be received by input assemblers of the second APD, discarding the second set of primitive groups.

11. The set of accelerated processing devices of claim 10, wherein designating the input assemblers to receive the primitive groups occurs in a round robin fashion with respect to the input assemblers.

12. The set of accelerated processing devices of claim 10, wherein the first and second APD are further configured to:
distribute the primitive groups, from each input assembler, to one or more attached vertex, geometry, and tessellation units for processing by shader programs.

13. The set of accelerated processing devices of claim 12, wherein the first and second APD are further configured to:
transmit the primitive groups to a hull shader for generation of patch control points.

14. The set of accelerated processing devices of claim 13, wherein the first and second APD are further configured to:
transmit the patch control points to a tessellation first-in-first-out buffer ("T-FIFO") of a set of T-FIFOs.

15. The set of accelerated processing devices of claim 14, wherein the first and second APD are further configured to:
select a T-FIFO of the set of T-FIFOs from which to receive a set of patch control points;
responsive to determining that one or more tessellation factors for the patch control points are available in an accelerated processing device other than the accelerated processing device that includes the arbiter, request the one or more tessellation factors from the accelerated processing device other than the accelerated processing device that includes the arbiter; and
process the set of patch control points and the one or more tessellation factors by a patch distributor.

16. The set of accelerated processing devices of claim 15, wherein processing the set of patch control points and the one or more tessellation factors by the patch distributor comprises:
selecting, by the patch distributor, a first vertex, geometry, and tessellation unit, to receive the set of patch control points generated by a hull shader stage; and
responsive to determining that the first vertex, geometry, and tessellation unit is included in the same accelerated processing device as the patch distributor, transmitting the set of patch control points to the first vertex, geometry, and tessellation unit.

17. The set of accelerated processing devices of claim 16, wherein the patch distributor is configured to:
selecting a second vertex, geometry, and tessellation unit, to receive a second set of patch control points generated by the hull shader stage; and
responsive to determining that the first vertex, geometry, and tessellation unit is not included in the same accelerated processing device as the patch distributor, discard the second set of patch control points.

18. The set of accelerated processing devices of claim 10, wherein the first APD is further configured to:
process the first set of primitive groups by a world-space pipeline and a screen-space pipeline.

19. A computing device comprising:
a central processing unit configured to generate draw calls; and
a set of accelerated processing devices for sharing graphics processing work, the set comprising:
a first accelerated processing device ("APD"); and
a second APD,
wherein both the first and second APD are configured to:
receive a set of draw calls;
split the set of draw calls into a set of primitive groups; and
for each primitive group of the set of primitive groups, designate an input assembler to receive the primitive group, wherein for each primitive group, the designated input assembler is the same for the first APD and the second APD;
wherein the first APD is configured to:
for a first set of primitive groups designated to be received by input assemblers of the first APD, transmit the first set of primitive groups to the designated input assemblers; and
for a second set of primitive groups designated to be received by input assemblers of the second APD, discarding the second set of primitive groups.

20. The computing device of claim 19, wherein the first APD is further configured to:
process the first set of primitive groups by a world-space pipeline and a screen-space pipeline.

* * * * *